(12) United States Patent
Cohen (10) Patent No.: US 9,266,187 B2
(45) Date of Patent: Feb. 23, 2016

(54) METHOD OF MONITORING THERMAL RESPONSE, FORCE AND CURRENT DURING RESISTANCE WELDING

(71) Applicant: Robert K. Cohen, Wynantskill, NY (US)

(72) Inventor: Robert K. Cohen, Wynantskill, NY (US)

( * ) Notice: Subject to any disclaimer, the term of this patent is extended or adjusted under 35 U.S.C. 154(b) by 359 days.

(21) Appl. No.: 13/927,732

(22) Filed: Jun. 26, 2013

(65) Prior Publication Data

US 2015/0001190 A1    Jan. 1, 2015

(51) Int. Cl.
    *B23K 11/25*    (2006.01)

(52) U.S. Cl.
    CPC ............. *B23K 11/253* (2013.01); *B23K 11/255* (2013.01); *B23K 11/257* (2013.01)

(58) Field of Classification Search
    CPC .... B23K 11/25; B23K 11/30; B23K 11/2009; B23K 11/252; B23K 11/253; B23K 11/255; B23K 11/257; B23K 11/315
    See application file for complete search history.

(56) References Cited

U.S. PATENT DOCUMENTS

| | | |
|---|---|---|
| 3,676,652 A | 7/1972 | Millis, Jr. et al. |
| 4,028,522 A | 6/1977 | Chihoski et al. |
| 4,296,304 A | 10/1981 | Defourny |
| 4,419,558 A | 12/1983 | Stiebel |
| 4,447,700 A | 5/1984 | Cohen |
| 4,461,944 A | 7/1984 | Cohen |
| 4,472,620 A | 9/1984 | Nied |
| 4,596,917 A | 6/1986 | Nied et al. |
| 4,680,441 A | 7/1987 | McKendrick |
| 4,721,906 A | 1/1988 | Ferguson et al. |
| 4,831,228 A | 5/1989 | Schumacher |
| 4,861,960 A | 8/1989 | Haefner et al. |
| 5,254,828 A | 10/1993 | Stiebel |
| 5,343,011 A | 8/1994 | Fujii et al. |
| 5,360,958 A | 11/1994 | Bogue et al. |
| 5,393,950 A | 2/1995 | Killian |
| 5,397,872 A | 3/1995 | Baker et al. |
| 5,434,382 A | 7/1995 | Schlattl et al. |

(Continued)

FOREIGN PATENT DOCUMENTS

| | | |
|---|---|---|
| EP | 1118417 B1 | 5/2004 |
| EP | 2353766 A2 | 8/2011 |

(Continued)

OTHER PUBLICATIONS

International Search Report and Written Opinion mailed Mar. 11, 2015 for PCT/US14/43575.

*Primary Examiner* — Brian Jennison
(74) *Attorney, Agent, or Firm* — Buchanan, Ingersoll & Rooney PC (57) ABSTRACT

A method of measuring weld thermal response as a function of time during the production of a resistance weld includes monitoring a first parameter responsive to a change in an electrode mechanical load on workpieces welded together with respect to the electrode mechanical load applied prior to application of the heat, monitoring a second parameter responsive to a change in position of linkage applying the electrode load with respect to linkage position prior to application of the heat, and processing a composite of the first parameter and the second parameter to produce a derived measurement representative of the thermal response of the weld. Electrode force and electrode current are also monitored via sensors and measurements calibrated to provide more accurate information during the welding process.

19 Claims, 4 Drawing Sheets

(56) References Cited

U.S. PATENT DOCUMENTS

| | | | |
|---|---|---|---|
| 5,484,975 | A | 1/1996 | Itatsu |
| 5,504,299 | A | 4/1996 | Heckendorn |
| 5,514,846 | A | 5/1996 | Cecil et al. |
| 5,558,785 | A | 9/1996 | Killian et al. |
| 5,575,934 | A | 11/1996 | Takakuwa et al. |
| 5,587,091 | A | 12/1996 | Kawagoe et al. |
| 5,883,355 | A | 3/1999 | Kaneshima |
| 5,906,755 | A | 5/1999 | Arasuna et al. |
| 6,043,449 | A | 3/2000 | Kanjo |
| 6,072,145 | A | 6/2000 | Suita et al. |
| 6,184,491 | B1 | 2/2001 | Crane et al. |
| 6,274,840 | B1 | 8/2001 | Kanjo |
| 6,335,504 | B1 | 1/2002 | Ling et al. |
| 6,342,686 | B1 | 1/2002 | Farrow |
| 6,359,249 | B1 | 3/2002 | Brown et al. |
| 6,414,259 | B2 | 7/2002 | Kanjo |
| 6,479,784 | B1 | 11/2002 | Tagliavini |
| 6,506,997 | B2 * | 1/2003 | Matsuyama ............... 219/110 |
| 6,515,251 | B1 | 2/2003 | Wind |
| 6,903,298 | B2 | 6/2005 | Wang et al. |
| 6,906,276 | B2 | 6/2005 | Kaeseler et al. |
| 7,145,097 | B2 | 12/2006 | Leach et al. |
| 7,259,349 | B2 | 8/2007 | Stieglbauer et al. |
| 7,511,244 | B2 | 3/2009 | Stieglbauer et al. |
| 7,633,032 | B2 | 12/2009 | Wang et al. |
| 7,728,249 | B2 | 6/2010 | Auger |
| 8,076,604 | B2 | 12/2011 | Rippl |

FOREIGN PATENT DOCUMENTS

| | | |
|---|---|---|
| WO | WO 97/02106 | 1/1997 |
| WO | WO 03/008146 A1 | 1/2003 |

* cited by examiner

METHOD OF MONITORING THERMAL RESPONSE, FORCE AND CURRENT DURING RESISTANCE WELDING

FIELD OF THE INVENTION

The invention relates to a method of monitoring a resistance welding process during the weld operation.

BACKGROUND

Resistance welding is a process for joining metals, such as steel, aluminum, titanium, metal-matrix composites, or other sheet metals that involves clamping two or more parts together between two electrodes and passing a series of low voltage, high current pulses through the parts. The welding is performed using a weld machine typically having copper or copper alloy welding electrodes (i.e., a fixed electrode and a movable electrode or two movable electrodes). The electrodes are aligned in opposition to each other. They are positioned around sheet metal layers at a specified spot weld site and clamp and press the layers between the two electrodes. A large electric current is momentarily passed between the opposing electrodes through the electrically resistive metal pressed between them. The sheet metal between the electrodes is briefly melted during current flow and then re-solidified to form an integral weld nugget of suitable diameter at the faying surfaces of the sheet metal layers. In a typical manufacturing operation, many welds are rapidly formed. The goal is to form all of the welds to meet size and strength design requirements, within an acceptable tolerance value, and with minimal internal porosity or discontinuities.

Many resistance welding production procedures consist of establishing the process welding parameters by trial and error. Such parameters typically consist of applied electrode load, heat and time. During production, occasional test coupons are made which are destructively inspected to determine weld nugget size and penetration. This manufacturing procedure has produced different size and strength production welds since the test coupon geometry, surface conditions, etc., may not be representative of the production conditions. Actual production parts are often destructively tested to help circumvent this problem. These destructive tests can provide information about the statistical consistency of a group of welds produced, but they provide no information about the repeatability of any specific weld that isn't destroyed. As a result, manufacturers employing this method of quality control routinely produce bad welds that pass through production undetected. Thus there is a need for an improved method of measuring the repeatability of every weld in order to eliminate the problem of poor welds passing through production undetected.

Welding controllers are used to control the force applied by the movable electrode on the metal surface at the weld site. The controller also is programmed to control the weld current as a function of time. The force applied to the welding site by the electrode and the resistive heat generated by the welding current results in an indentation (caused by the displacement of the electrode) in the softened welded surface of the workpiece at the location of the weld nugget. In setting up the welding machine to produce a series of uniform welds, initial values of suitable electrode force, welding current as a function of time, and the duration that electrode force is maintained after termination of the welding current (hold time) are established for the welding machine or gun and the specific workpieces. While the welding controller can be programmed in an attempt to maintain these values so that the same welds are produced during extended manufacturing operations, weld repeatability can vary due to electrode wear, workpiece gap, weld spacing, part orientation and other geometry variations. Furthermore, weld repeatability can be affected by variations in the operation of the welding machine(s) and external disturbances such as power line fluctuations and cooling water temperature. Thus there is need for an improved method of measuring weld repeatability as the weld is taking place that would allow a multi-variable monitor to detect conditions that would adversely affect the outcome of a weld and, in the case of an adaptive control, use that information to take intelligent corrective actions to prevent poor welds from being produced.

Factory resistance welding facilities typically perform periodic destructive testing of actual production parts or test samples which are supposed to be representative of the actual welding conditions. These quality control procedures are laborious and have an adverse impact on factory productivity as well as making the resistance welding procedure more complicated, and do not ensure complete reliability of the welding process because they provide no information about the welds that are not destroyed. Therefore improved methods to sense welding conditions and provide a reliable measure of weld process repeatability are needed.

SUMMARY

According to one embodiment, a method of measuring weld thermal response as a function of time during the production of a weld on a resistance welding machine wherein electrodes apply an electrode mechanical load to workpieces and a circuit applies voltage across the workpieces such that current flows through the workpieces and generates heat which raises the temperature of the workpieces is provided. The method comprises monitoring a first parameter responsive to a change in the electrode mechanical load with respect to the electrode mechanical load applied prior to application of the heat, monitoring a second parameter responsive to a change in position of linkage applying the electrode load with respect to linkage position prior to application of the heat, processing a composite of the first parameter and the second parameter to produce a derived measurement representative of the thermal response of the weld.

In another embodiment, a method of monitoring electrode current as a function of time during the production of a weld on a resistance welding machine wherein electrodes apply an electrode mechanical load to workpieces and a circuit applies voltage across the workpieces such that current flows through the workpieces and generates heat which raises the temperature of the workpieces is provided. The method comprises monitoring electrode current using two current sensors wherein a first current sensor measures current during a short duration at the start of the weld and the second current sensor measures current for the balance of the weld, the first current sensor providing a calibrated accurate current reading upon initiation of current for a limited duration of time after the first current is applied to the electrodes and the second current sensor providing an output signal that is a linear function of electrode current over an extended duration of time.

In a further embodiment, a method of monitoring electrode force as a function of time during the production of a weld on a resistance welding machine wherein electrodes apply an electrode mechanical load to workpieces and a circuit applies voltage across the workpieces such that current flows through the workpieces and generates heat which raises the temperature of the workpieces is provided. The method comprises monitoring electrode force using a composite measurement which is a function of information from two sensors wherein one sensor monitors force applied to the linkage applying the electrode force and the other sensor monitors a change in electrode force during the weld, the method including automatically calibrating the sensors to increase accuracy of measurement of instantaneous electrode force as a function of time.

DETAILED DESCRIPTION

Disclosed herein is a method of monitoring thermal response during the production of a weld on a resistance welding machine, wherein the method comprises deriving a composite measurement which is a function of information supplied by two sensors wherein one sensor monitors a change in electrode force during the weld and the other sensor monitors a change in position of the welding machine linkage applying the electrode force.

The resistance welding process of joining two materials due to a localized metallic fusion across their interface is a complicated electrical, thermal, mechanical and metallurgical phenomenon. The low electrical resistance electrodes, which carry a high current to a localized area of the workpieces, exert a concentrated force on the outer surfaces of the materials to be joined. This electrode force produces a local deformation at the interface of the metals to be joined and indents the outer surfaces due to the highly concentrated compressive stresses. The purpose of the electrode load is to maintain good electrical contact and apply a force distribution that contains the molten nugget formed by the heat generation from the applied current. The total electrical resistance of the system, typically composed of copper electrodes and the metal sheets to be joined, consists of the material resistances of the copper and the workpieces, plus the surface contact resistances at each material interface. The surface contact resistance is due to surface films, oxides and asperities at the interfaces. A high electrode force, producing a localized compressive interface stress, will help break down the asperities of the surfaces, thereby providing good contact which will result in reduced surface electrical resistance. Since the electrical resistances of the copper electrodes and metals to be joined are small, a large current discharge is needed to produce the Joule heating effect. The voltage drop and Joule heating effect are largest in the workpieces since the resistivity of the copper electrodes is typically an order of magnitude less than most metals to be joined.

Transient heating of the workpieces generates thermal expansion and stresses. If sufficient current is maintained for a sufficient length of time, melting will initiate at the common interface of the workpieces and spread to produce the weld nugget. This phase change from solid to liquid produces a change in material properties. During the weld cycle, sufficient electrode load must be maintained to offset the high opposing forces generated from the internal thermal expansion and, thereby, contain the molten metal within the workpiece. This prevents liquid metal expulsion. During the welding cycle, the electrode load also helps to maintain proper electrical and thermal contact until the formation of the weld nugget is completed. The weld cycle is terminated by switching the current off while maintaining the electrode load. The final stage of the process is the hold cycle, which establishes the rate of cooling as long as applied electrode force is maintained. This can affect the metallurgical quality of the weld nugget. During the hold cycle, the nugget cools and contracts. Mechanical load is essential to provide the necessary forging pressure to obtain a good metallurgical structure and to prevent the formation of shrinkage voids.

Figure 1:
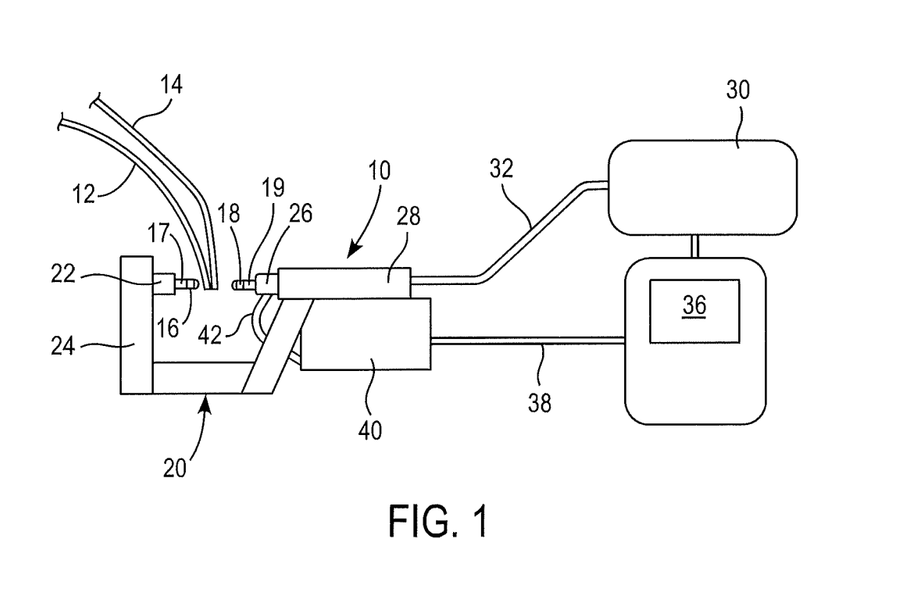
FIG. 1 is a schematic of a resistance spot welding machine with the associated equipment used in spot welding operations that may be used in accordance with preferred embodiments of resistance spot welding machines described herein.

A schematic illustration of a resistance spot welding machine 10 (welding gun) with the associated equipment utilized in spot welding operations that may be used in accordance with preferred embodiments of resistance spot welding guns described herein is shown in FIG. 1. In such an operation, an assembly of workpieces, such as two or more sheet metal layers, to be welded are prepared at a suitable location and transported by means (not shown) to the welding gun 10. In alternate embodiments the welding gun 10 may be mounted on the end of a robot arm such that the welding gun 10 may be moved to meet the assembly of the sheet metal layers which are to be spot welded.

In FIG. 1, workpieces 12, 14 are shown placed between axially aligned and opposing electrodes 16, 18 of a welding gun arm 20. It is seen that welding gun arm 20 is in the configuration of a "C" so that opposing electrodes 16, 18 can apply an electrode mechanical load or force on opposite sides of the workpieces 12, 14.

In the arrangement shown, electrode 16 is a fixed electrode mounted on a shank 17 which is inserted in a holder 22 attached to a fixed arm 24 of welding gun arm 20. The other electrode 18 is moveable in a direction towards and away from electrode 16. Electrode 18 is mounted on a shank 19 and inserted in a moveable member 26 carried in an actuator 28. The actuator 28 has a fixed portion attached to the welding gun 10 and moveable member 26 which is responsible for applying the electrode force to workpieces 12, 14. The actuator 28 is adapted to axially move electrode 18 into a clamping engagement with the outer surface of workpiece 14. Actuator 28 can include a drive cylinder and a servomotor to move electrode 18. An electrical current is commanded by a multivariable process controller 30 and delivered through transmission line 32 to actuator 28. In alternate embodiments, the actuator 28 can be a pneumatic cylinder.

Figure 4:
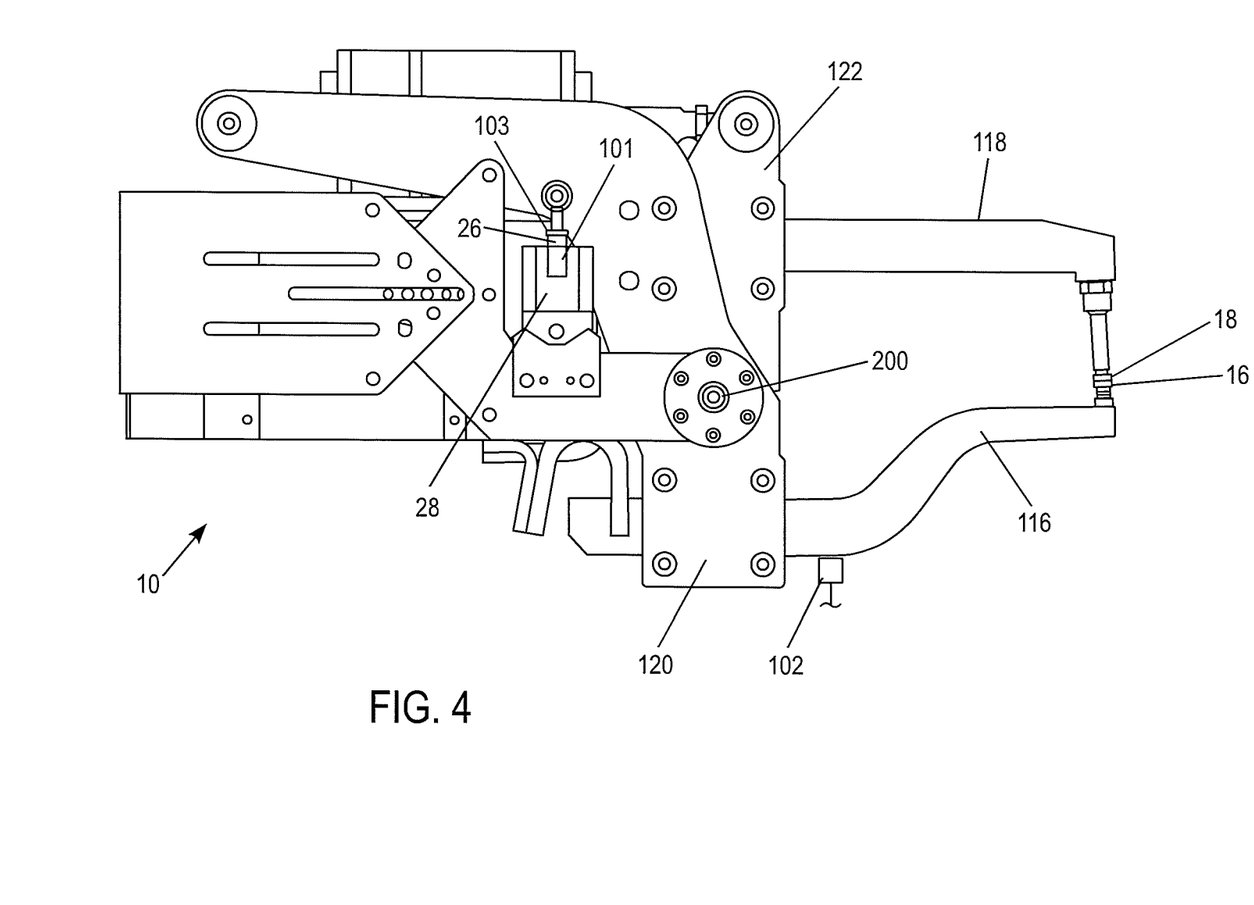
FIG. 4 illustrates an alternate preferred embodiment of a resistance spot welding machine having a system of sensors to monitor electrode force and electrode displacement.

In an alternate embodiment as illustrated in FIG. 4, the welding gun 10 may have an "X" shaped configuration. The resistance spot welding gun 10 has an upper electrode holder arm 118 and a lower electrode holder arm 116 both of which are movable about a pivot 200. In alternate embodiments one electrode holder arm may be fixed while the other electrode holder arm is moveable about pivot 200. Inner ends of electrode holder arms 118, 116 are mounted in an upper electrode leg 122 and a lower electrode leg 120, respectively. The electrodes 16, 18 are mounted on free ends of the holder arms 116, 118 to engage and clamp workpieces with a predetermined electrode mechanical load. The predetermined electrode mechanical load is applied by actuator 28 which has linkage connecting the lower electrode leg 120 to the upper electrode leg 122. The moveable member 26 of actuator 28 is configured to pivot the lower and upper electrode legs 120, 122 and respective lower and upper electrode holder arms 116, 118 about pivot 200, moving the electrodes 16, 18 towards and away from the workpieces. In an alternate embodiment moveable member 26 of actuator 28 is configured to pivot one electrode leg and respective electrode holder arm while the other electrode leg and respective electrode holder arm is fixed. In alternate embodiments, the actuator 28 can be a pneumatic cylinder.

The welding gun arm 20, shown in FIG. 1, may be stationary or it may be applied on the end of a robot arm. In either arrangement, the multivariable process controller 30 is associated with welding gun arm 20 to suitably execute resistance welding operations. The process controller 30 is programmed to initiate and control the movement of the robot and/or the actuation of the welding machine to engage or to receive the workpieces 12, 14. Process controller 30 manages actuator 28 and a welding current controller 36.

Welding current controller 36 regulates the passage of a welding current from a remote source, not shown. The welding energy source may be 50 Hz or 60 Hz single phase or three phase alternating current, an inverter or other semiconductor controlled power supply, a bank of capacitors, battery or other suitable power source. Upon command of multivariable process controller 30, the primary current is delivered through a primary current line 38 to weld transformer 40. Weld transformer 40 converts the primary current to a lower voltage, but higher current. A secondary welding current is provided through a secondary current line 42 and moveable member 26 as well as welding gun arm 20 and electrode holder 22 which are conductive. In an alternate embodiment, current may be transferred to the electrodes directly from the welding power supply without a weld transformer 40. The welding current may be on the order of less than 100 to more than 100,000 amperes (A) and the time that the current is applied may range from less than 5 milliseconds to greater than 1 second depending upon the requirements of the welding operation.

When movable electrode 18 has been brought into contact with workpiece 14, multivariable process controller 30 initiates the weld operation. Prior to a voltage being applied across the electrodes 16, 18 a preconditioning step may be performed comprising alternating between the application of a first fixed electrode mechanical force and a second fixed electrode mechanical force to shore up the interface between workpieces 12, 14. The preconditioning step may increase electrical contact between the workpieces 12, 14 such that electrical resistance is lowered at the interface between workpieces 12, 14. Welding current controller 36 is commanded to deliver current through electrodes 18 and 16, while multivariable process controller 30 commands actuator 28 to advance movable electrode 18 during welding for the purpose of controlling the electrode mechanical force on workpieces 12, 14. The Joule heating caused by the current applied through workpieces 12, 14 causes the workpieces 12, 14 to thermally expand forming a nugget between the interface of the workpieces 12, 14. The thermal expansion causes movement of electrodes 16, 18 which in turn causes displacement of moveable member 26 of actuator 28, as well as some deflection in the welding gun arms. The composite of the displacement of moveable member 26 of actuator 28 as well as the deflection in the welding gun arms provides an accurate indication of the thermal response of the weld. The process applies to projection welding as well.

Upon the termination of voltage applied across the electrodes 16, 18 cooling of the welding spot begins causing thermal contraction of workpieces 12, 14. At the end of the solidification of the fused metal, the electrode mechanical load is released to enable the movement of the electrodes 16, 18 toward another location on the workpieces 12, 14 to be welded.

Figure 2:
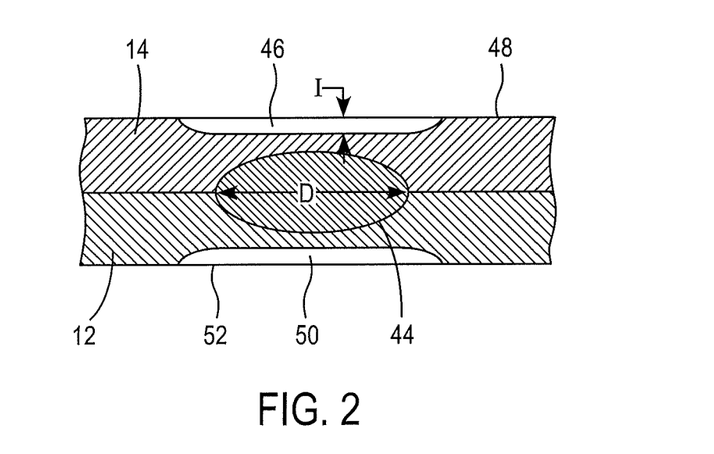
FIG. 2 is an enlarged fragmentary sectional view of two sheet metal parts attached with a spot weld nugget.

A spot weld nugget 44 joining workpieces 12, 14 is shown in the enlarged, fragmentary sectional view of FIG. 2. (This figure should be fixed by making width of the indented sections 46 and 50 wider than the nugget diameter D.) The nugget 44, elliptical in cross section, is formed at the faying surfaces of workpieces 12, 14. The upper surface 48 of sheet 14 is slightly depressed at surface 46 below the level of surface 48. This indentation (indicated at I) from surface 48 to surface 46 results from plastic deformation of workpiece 14 caused by the welding force applied by movable electrode 18. Indented surface 46 conforms to the shape of the surface area of the tip of movable electrode 18 that is in contact with the surface 48. Similarly, a lower surface region 50 of sheet 12 is indented in surface 52 of workpiece 12 due to the reactive force of fixed electrode 16.

The accurate measurement of electrode displacement, force (i.e. electrode mechanical load), and current as a function of time during the welding operation has been demonstrated to be able to provide a reliable measure of weld process repeatability. This is because for a given applied electrode force and current, changes in the weld consistency from weld to weld will cause a change in the electrode displacement as a function of time and/or a change in the electrode mechanical load as a function of time. However, these signals are often impractical to measure with conventional production resistance welding equipment because of the interaction between the actual electrode movement, applied force and the actuating mechanisms of different machines. According to an embodiment, a measuring method to formulate a parameter referred to herein as "Adjusted Thermal Force" (ATF) is correlated with the actual evaluation of the weld, a measurement which is minimally affected by the varying characteristics of the wide variety of different types of resistance welding machines in commercial use.

Figure 3:
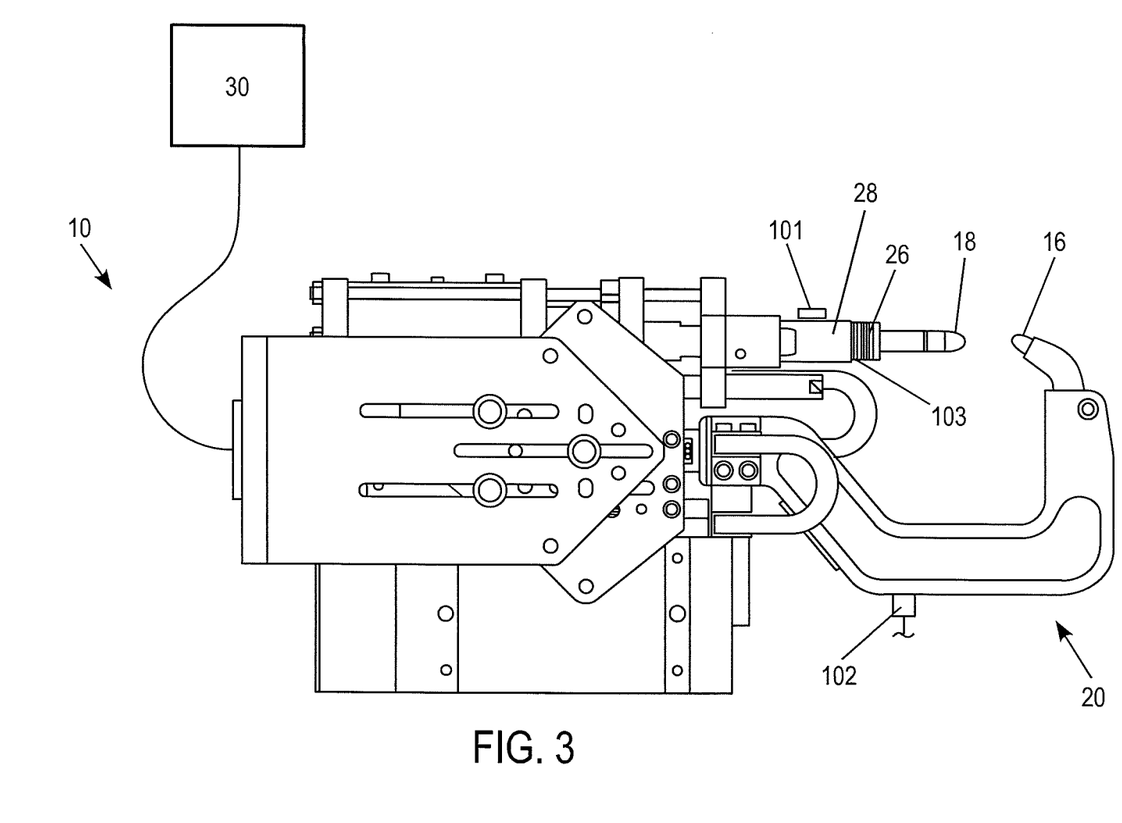
FIG. 3 illustrates a preferred embodiment of a resistance spot welding machine having a system of sensors to monitor electrode force and electrode displacement.

FIG. 3 illustrates a preferred embodiment of a resistance spot welding gun 10. The welding gun 10 includes a sensor configuration 101, 102 designed to measure electrode displacement values as a function of time during the resistance welding process. The welding gun 10 also includes a sensor configuration 102, 103 to measure the electrode mechanical load values. In an alternate embodiment, the welding gun 10 may also include a sensor configuration (see FIG. 5) to measure the current running through the electrodes 16, 18.

The welding gun 10 includes a sensor configuration 101, 102 designed to measure the displacement of electrodes 16, 18 as a function of time during the resistance welding process. Electrode displacement results from thermal expansion in workpieces during the resistance welding process. During the resistance welding process, the resistive properties of the workpieces cause the workpieces to increase in temperature as a voltage is applied across the electrodes 16, 18. As thermal expansion is an instantaneous physical response to the average temperature through the axis of the workpieces, a thermal expansion measurement (i.e. an electrode displacement measurement) provides a means for monitoring the temperature reached during weld formation. Since weld size and strength can be linked to the temperature reached during welding, measurement of Adjusted Thermal Force provides a practical method of measuring weld consistency as well as the size and strength of the weld.

If no actuator motion occurs during formation of a weld then the change in force "Thermal Force" provides a good measure of the weld thermal response, indicative of weld repeatability. In the presense of actuator motion that occurs during the weld, the measure of "Thermal Force" obtained from measuring a change in output of sensor 102 degrades as a measure of "Thermal Force". The composite measure of thermal force "Adjusted Thermal Force" (ATF) provides a measurement comparable to "Thermal Force" that would be measured by sensor 102 had no actuator motion taken place during the weld.

The resistance welding gun 10 illustrated in FIG. 3 includes an actuator displacement sensor 101. Actuator displacement sensor 101 is electrically connected to multivariable process controller 30 and can be mounted on a fixed surface of welding gun 10. Actuator displacement sensor 101 is configured to measure the displacement of moveable member 26 carried in actuator 28 during the resistance spot welding process. In a preferred embodiment the actuator displacement sensor 101 is mounted on the same surface that supports the fixed portion of actuator 28. In an alternate preferred embodiment the actuator displacement sensor 101 is embedded within actuator 28. The actuator displacement sensor 101 further includes linkage connected to moveable member 26 of actuator 28 to measure the change in position of moveable member 26. Preferably actuator displacement sensor 101 is a linear variable differential transformer, linear potentiometer, quadrature phase encoder, or absolute encoder which monitors the change in position of the moveable member 26 of actuator 28 which is responsible for the electrode mechanical load.

The resistance welding gun 10 also includes a force sensor 102 which is electrically connected to multivariable process controller 30 and is configured to measure an instantaneous mechanical strain on the resistance welding gun 10 during the resistance welding process. Preferably the force (instantaneous mechanical strain) sensor 102 is a stress transducer, or other strain measurement device mounted on welding gun arm 20 at a position that undergoes deflection when actuator 28 applies an electrode mechanical load to the workpieces and when the workpieces thermally expand and contract from weld formation. The force sensor 102 can also be a piezoelectric sensor mounted on welding gun arm 20 at a position that undergoes deflection when actuator 28 applies an electrode mechanical load to the workpieces.

In a preferred embodiment the welding gun 10 also includes a second force sensor 103 which is electrically connected to multivariable process controller 30 and is configured to measure the actuator applied electrode mechanical load. In other words, the second force (actuator applied electrode mechanical load) sensor 103 measures the applied force to the workpieces effectuated by actuator 28. The second force sensor 103 has degraded transient response to the applied force because there are linkages and sources of friction, binding and hysteresis between where it is mounted and the electrode force that is desired to be measured, but because it is placed directly in line with the force generating linkage it is able to provide a calibrated measure of the actual force applied by the linkage, that can be used to scale the output of sensor 102 to provide a measure of electrode force that not only exhibits excellent transient response but is calibrated to provide an accurate force measurement. The second force sensor 103 can be a strain gauge bridge type load cell built into the linkage connecting moveable member 26 of actuator 28 to electrode 18.

FIG. 4 illustrates an alternate preferred embodiment of a resistance spot welding gun 10. The welding gun 10 includes a sensor configuration designed to measure electrode displacement values as a function of time during the resistance welding process. The welding gun 10 also includes a sensor configuration to measure the electrode mechanical load values, as well as a sensor configuration to measure the current running through the electrodes 16, 18.

The resistance welding gun 10 illustrated in FIG. 4 includes an actuator displacement sensor 101. Actuator displacement sensor 101 is electrically connected to multivariable process controller 30 and can be mounted on a fixed surface of the welding gun 10. Actuator displacement sensor 101 is configured to measure the displacement of moveable member 26 carried in actuator 28. In a preferred embodiment the actuator displacement sensor 101 is mounted on the same surface that supports the fixed portion of actuator 28. In an alternate preferred embodiment the actuator displacement sensor 101 is embedded within actuator 28. The actuator displacement sensor 101 further includes linkage connected to moveable member 26 of actuator 28 to measure the change in position of moveable member 26. Preferably actuator displacement sensor 101 is a linear variable differential transformer, linear potentiometer, quadrature phase encoder, or absolute encoder which monitors the change in position of the moveable member 26 of actuator 28 which is responsible for the electrode mechanical load.

The resistance welding gun 10 illustrated in FIG. 4 also includes a force sensor 102 which is electrically connected to multivariable process controller 30 and is configured to measure an instantaneous mechanical strain during the resistance weld process. Preferably the force sensor 102 is a stress transducer, or other strain measurement device which may be mounted on the fixed upper electrode holder arm 118 or the moveable lower electrode holder arm 116 at a position that undergoes deflection when actuator 28 applies an electrode mechanical load to the workpieces. In an alternate embodiment, upper electrode holder arm 118 may be moveable while lower electrode holder arm 116 is fixed, or both upper and lower electrode holder arms 116, 118 are moveable.

The force sensor 102 can be a piezoelectric sensor mounted on the upper or lower electrode holder arm 118, 116 at a position that undergoes deflection when actuator 28 applies an electrode mechanical load to the workpieces. In an alternate embodiment the force sensor 103 may be a load cell directly in line with the direction of movement of the moveable member 26 of actuator 28 whose static output after application of electrode force and prior to initiation of weld heat is used to calibrate sensor 102, which is subsequently used to provide electrode force measurements throughout the balance of the duration of the weld.

In a preferred embodiment, the force sensor 102 is mounted on the lower electrode holder arm 116, in a practical location that obtains a good measurement signal proportional to the deflection due to bending of lower electrode holder arm 116 in response to the electrode mechanical load applied by electrodes 16, 18 to the workpieces.

In a preferred embodiment the welding gun 10 illustrated in FIG. 4 also includes a second force sensor 103 which is electrically connected to multivariable process controller 30 and is configured to measure the actuator applied electrode mechanical load. In other words, the second force sensor 103 measures the applied force to the workpieces effectuated by actuator 28. The second force sensor 103 is calibrated to provide accurate measurements of the static force applied by moveable member 26 of actuator 28 to the workpieces via the electrodes 16, 18. The second force sensor 103 can be a piezoelectric or strain gauge bridge load cell which may be inserted between the actuator 28 and moving assembly 26 or may be built into weld head or actuator 28. In an alternate embodiment where the actuator is an electrically servo operated mechanism, the current used to operate the servo may provide a measure of the applied quasi static force. In an alternate embodiment where the actuator is a pneumatic cylinder a pressure sensor may provide a measure of the applied quasi static force used to dynamically calibrate transient force sensor 102.

According to a first embodiment, a method of monitoring thermal response during the production of a weld on a resistance welding machine comprises deriving a composite measurement which is a function of information supplied by two sensors wherein one sensor monitors a change in electrode force during the weld and the other sensor monitors a change in position of welding machine linkage applying the electrode force. Information provided by monitoring the thermal response may be used to provide information about the quality of the weld as discussed herein.

The thermal response can be monitored by calculating Adjusted Thermal Force ("ATF") by applying a first electrode force ("EF1") and measuring a first linkage position ("LP1"), applying a second electrode force ("EF2") and measuring a second linkage position ("LP2"), then calculating ATF as ATF=(EF2−EF1)+K2·(LP2−LP1). The ATF measurement can be converted to an expansion measurement by dividing ATF by spring constant K2. The spring constant K2 can be calculated by measuring an initial force ("EF1") and an initial linkage position ("LP1"), measuring a second force ("EF2") and a second linkage position (LP2) wherein K2·(EF2−EF1)/(LP2−LP1). Thus, a correction to the thermal force measurement caused by linkage motion that occurs during the weld by deriving a processed thermal force measurement indicative of weld response can be applied to standard welding apparatus. The correction can be achieved with a transducer which monitors motion of the linkage and multiplying the change in motion as a function of time with respect to the initial position of the linkage at the start of the weld by a spring constant of the welding apparatus.

According to another embodiment, a method of monitoring relative electrode force uses a composite measurement which is a function of information from two sensors wherein one sensor monitors force applied to the linkage applying the electrode force and the other sensor monitors a change in electrode force during the weld. The method can include automatically calibrating the sensors to provide a more accurate measurement of instantaneous electrode force as a function of time that is more immune to drift than could otherwise be achieved with a single sensor. The electrode force can be measured as a function of time during the production of the weld as follows. An electrode mechanical load value ("EMLV"), which is measured as a function of time may be found by a method of processing measurements taken by first force sensor 102 and second force sensor 103. To calculate the electrode force on the workpieces, the second force sensor 103 measures an initial applied force ("F(a$_i$)") applied by moveable member 26 of actuator 28 to the workpieces. This initial applied force value is added to a calibrated change in force (i.e., electrode mechanical load) applied to the workpieces by actuator 28 during the welding process, wherein the precalibrated change in force is measured by force sensor 102. The calibrated change in force is measured as a function of time, wherein ("K") is the calibration factor. The calibration factor ("K") converts the change in force units, measured by force sensor 102, to units which are substantially similar to the initial applied force value units that are measured by force sensor 103. This calibrated change in force value is then added to the initial force value to produce the EMLV. That is, $$EMLV = F(a_i) + F[\text{force}(t)] \cdot K$$

The calibrated change in force is found by first measuring the initial force ("F(t$_i$)") placed on the workpieces by electrodes 16, 18 before the application of weld heat. This initial force value is then subtracted from a subsequent instantaneous force value ("F(t)") taken during the welding process. The change in force is then calibrated by a coefficient such that the change in force units is converted into units which are substantially similar to the initial force units. That is, $$F[\text{force}(t)][F(t) - F(t_i)] \cdot K$$

The K coefficient (i.e. calibration factor) is found by measuring the change in applied force of electrodes 16, 18 with respect to a known change in applied force applied by the electrode mechanical load as measured by force sensor 103. A first applied force measurement ("F(a$_1$)") is subtracted from a second applied force measurement ("F(a$_2$)"). This value is then divided by a corresponding first force value ("F$_1$") taken at the first applied force measurement, which is subtracted from a corresponding second force value ("F$_2$") taken at the second applied force measurement. The corresponding values are measured by force sensor 102. That is, $$K = [F(a_2) - F(a_1)]/(F_2 - F_1)$$

Multivariable process controller 30 uses the above equations to process the instantaneous mechanical strain variable, the actuator displacement variable, and/or the actuator applied electrode mechanical load variable to determine the range of values for electrode displacement and/or electrode mechanical load. The multivariable process controller 30 then retrieves the maximum electrode displacement value or the maximum electrode mechanical load value measured during the resistance welding process. Using information stored in the multivariable process controller 30, the process controller 30 determines whether the maximum electrode displacement value or the maximum electrode mechanical load value falls into the predetermined tolerance range of targeted values. In an alternate embodiment the multivariable process controller 30 will make a determination as to whether the maximum electrode displacement value and the maximum electrode mechanical load value each fall into a predetermined tolerance range of targeted values. In an alternate embodiment the pattern response will be analyzed to identify specific conditions such as expulsion or part fit-up problems.

In a preferred embodiment, the multivariable processing control 30 will apply current through the electrodes during the spot welding process as long as the calculated electrode displacement value or calculated electrode mechanical load value falls within a predetermined tolerance range of targeted values. In a preferred embodiment the multivariable processing control 30 will apply current through the electrodes during the welding process as long as the calculated ATF values fall within a predetermined tolerance range of targeted values. In other words, current will be applied through the electrodes during the welding process as long as the calculated ATF values exceed a predetermined minimum set of values and the calculated ATF values have not exceeded a predetermined maximum set of values. The multivariable processor may determine whether the weld should be rejected if the calculated ATF values do not fall within the predetermined tolerance ranges of targeted values.

In a preferred embodiment, measurements of the instantaneous mechanical strain variable, the actuator displacement variable, and the actuator applied electrode mechanical load variable are taken from a time when the electrode mechanical load is applied to the workpieces before current is supplied through the opposing electrodes to the completion of a cooling stage after current is no longer supplied through the opposing electrodes. Additionally in a preferred embodiment, the electrode mechanical load should be applied to the workpieces during the cooling stage until the calculated electrode displacement and/or the calculated electrode mechanical load fall below a predefined value.

If desired, the multivariable process controller 30 can be programmed to accept or reject welds based on the measurements described above. More preferably, if a weld is rejected the multivariable process controller 30 can be programmed to alert an operator of the resistance welding machine as to the rejection and as to the reason for the rejection.

Figure 5:
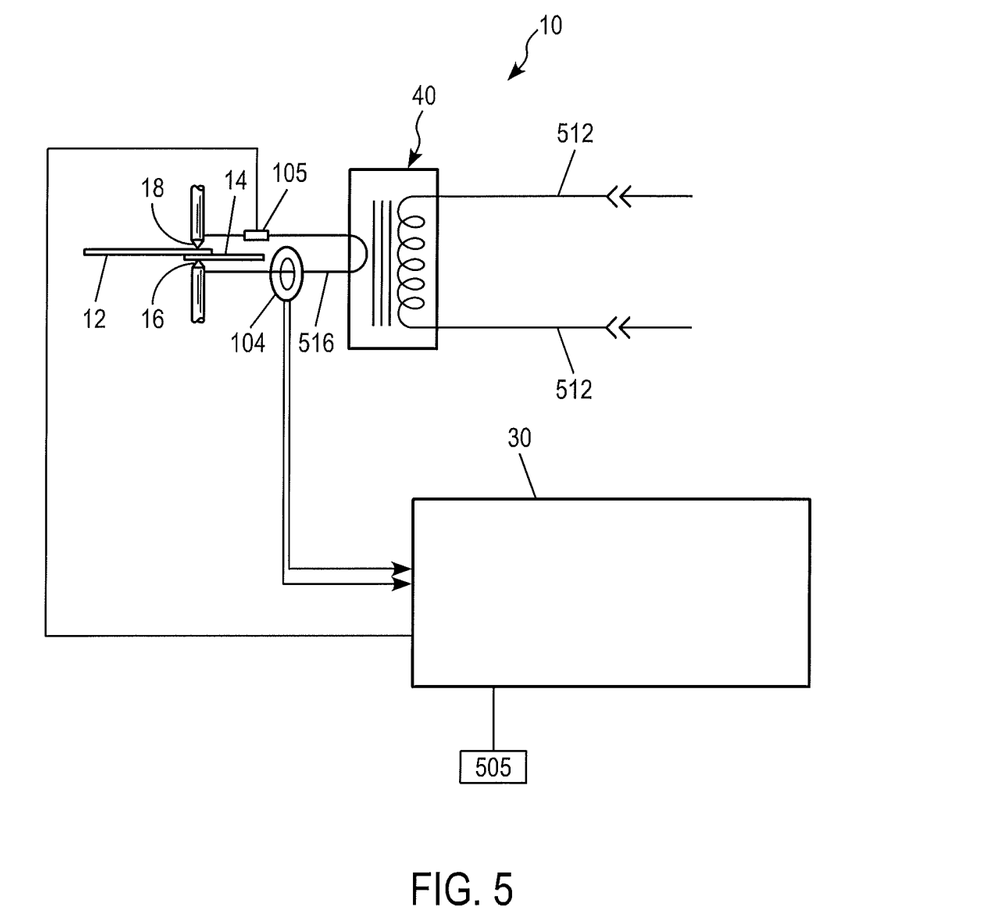
FIG. 5 illustrates a schematic diagram of an embodiment of a resistance welding machine, wherein a first current sensor and a second current sensor are used to monitor the current applied through the workpieces held by the resistance welding machine electrodes.

In a further embodiment, a method of monitoring current utilizes two current sensors. FIG. 5 illustrates a schematic diagram of an embodiment of the resistance spot welding gun 10, wherein a first current sensor 104 and a second current sensor 105 are used to monitor the current applied through workpieces 12, 14 by welding gun 10.

Referring to FIG. 5, welding gun 10 is provided with electric power by a pair of power lines 512. A transformer 40 steps down the power line voltage and increases the electrode current which is provided to secondary circuit 516 and electrodes 16, 18 which heat workpieces 12, 14. The electrode current passing through secondary circuit 516 is the current that is to be measured and controlled. Power lines 512 provide the power line voltage received by transformer 40. Power lines 512, transformer 40 comprises a primary circuit. The first current sensor 104 is preferably an air core toroid coil (also known as a Rogowski coil). The first current sensor 104 surrounds a cross-section of secondary circuit 516 and may be located at any point in secondary circuit 516. The changes in the electrode current passing through secondary circuit 516 induce an electro-magnetic force (EMF) within the toroid of the first current sensor 104. This EMF causes a differential voltage signal to be generated by the coil of the first current sensor 104 which is proportional to the rate of change of the magnetic field induced by the electrode current flowing in the welding circuit 516. Thus the differential voltage signal generated by the coil of first current sensor 104 is proportional to the first differential with respect to time of the electrode current passing through secondary circuit 516.

The first current sensor 104 is electrically connected to multivariable process controller 30 and works in conjunction with an electronic integrator 505 to produce accurate calibrated high current measurements, but only for a very limited period of time, because integration error increases as a function of time. Therefore a second current sensor 105 which is not calibrated, but produces an output proportional to the current without having an error that increases as a function of time, may be used to measure current for an extended period of time during the resistance welding process. The second current sensor 105 produces a conditioned signal output which is a linear function of electrode current over long durations. The second current sensor 105 is electrically connected to multivariable process controller 30 and produces a signal responsive to the current in the welding circuit 516. The second current sensor 105 may be a Hall Effect sensor, shunt resistor, or primary current measuring device which provides an output that is proportional to the welding current. Thus a system that uses the air core toroid coil calibrated current (while it produces accurate initial transient current measurements) to calibrate the Hall Effect sensor during the initial stage of the welding process may perform calibrated current measurements for extended periods of time.

The measurements of the first current sensor 104 and the second current sensor 105 may be processed by a method to produce accurate current measurements during the resistance welding process for extended periods of time. The method comprises the first and second current sensors 104, 105 each simultaneously measuring the current running through the welding circuit 516. The first current sensor 104 provides an initial calibrated current measurement when the welding current is first applied. The aforementioned initial calibrated current measurement is used to establish a calibration function for the second current sensor 105. After the calibration function is established, the second current sensor 105 continues to perform current measurements which are representative of the measurements taken by the first current sensor 104.

The calibration function used to convert the second current sensor 105 measurements into measurements which are representative of the first current sensor 104 measurements is determined by dividing the first current sensor 104 measurement by the conditioned signal output of the second current sensor 105. According to a further embodiment, a method of monitoring electrode current uses two current sensors wherein a first current sensor measures current during a short duration at the start of the weld and the second current sensor measures current for the balance of the weld. The first current sensor provides a calibrated accurate current reading upon initiation of current for a limited duration of time after the first current is applied to the electrodes. The second current sensor does not provide a calibrated current output and instead provides an output signal that is a linear function of electrode current over an extended duration of time. Before transitioning to the second current sensor, a calibration factor is calculated on the basis of simultaneous measurements of both sensors and the calibration factor is applied to the output of the second sensor.

While the invention has been described in detail with reference to specific embodiments thereof, it will be apparent to those skilled in the art that various changes and modifications can be made, and equivalents employed, without departing from the scope of the appended claims.

What is claimed is:

1. A method of measuring weld thermal response as a function of time during the production of a weld on a resistance welding machine, comprising:
positioning workpieces between electrodes of the resistance welding machine and applying an electrode mechanical load to the workpieces using the electrodes;
applying voltage across the workpieces and generating heat which raises the temperature of the workpieces;
monitoring a first parameter responsive to a change in the electrode mechanical load with respect to the electrode mechanical load applied prior to application of the heat;
monitoring a second parameter responsive to a change in position of linkage applying the electrode load with respect to linkage position prior to application of the heat;
processing a composite of the first parameter and the second parameter to produce a derived measurement representative of the thermal response of the weld;
wherein the derived measurement is adjusted thermal force ("ATF") applied by the electrodes to the workpieces, the adjusted thermal force being calculated by measuring an initial electrode force ("EF1") with a first sensor and initial linkage position ("LP1") with a second sensor prior to application of heat.

2. The method of claim 1, further comprising determining a spring constant ("K") of the linkage, and calculating ATF as $ATF=(EF2-EF1)+K \cdot (LP2-LP1)$.

3. The method of claim 2, wherein the electrode force is measured with a force transducer.

4. The method of claim 2, wherein the adjusted thermal force (ATF) is converted to an expansion measurement by dividing ATF by the spring constant (K).

5. The method of claim 2, further comprising monitoring electrode force using a composite measurement which is a function of information from two sensors wherein one sensor monitors force applied to the linkage applying the electrode force and the other sensor monitors a change in electrode force during the weld, the method including automatically calibrating the sensors to increase accuracy of measurement of instantaneous electrode force as a function of time.

6. The method of claim 5, further comprising monitoring electrode current using two current sensors wherein a first current sensor measures current during a short duration at the start of the weld and the second current sensor measures current for the balance of the weld, the first current sensor providing a calibrated accurate current reading upon initiation of current for a limited duration of time after the first current is applied to the electrodes and the second current sensor providing an output signal that is a linear function of electrode current over an extended duration of time.

7. The method of claim 1, further comprising measuring current flowing through the electrodes by measuring an initially applied current flowing through the electrodes using an initial calibrated current sensor, and a sensor which measures a linear output indicative of current, dividing an initial calibrated current sensor measurement by the linear output to determine a calibration factor, continuing to monitor the current with the initial calibrated current sensor, and processing the linear output with the calibration factor to calculate the current flowing through the electrodes during the weld.

8. The method of claim 7, further comprising determining whether the calculated current falls within a predetermined tolerance range of targeted values.

9. A method of monitoring electrode current as a function of time during the production of a weld on a resistance welding machine wherein electrodes apply an electrode mechanical load to workpieces and a circuit applies voltage across the workpieces such that current flows through the workpieces and generates heat which raises the temperature of the workpieces, the method comprising:
monitoring electrode current using two current sensors wherein a first current sensor measures current during a short duration at the start of the weld and the second current sensor measures current for the balance of the weld,
the first current sensor providing a calibrated accurate current reading upon initiation of current for a limited duration of time after the first current is applied to the electrodes and
the second current sensor providing an output signal that is a linear function of electrode current over an extended duration of time.

10. The method of claim 9, wherein before transitioning to the second current sensor, a calibration factor is calculated on the basis of simultaneous measurements of the first and second current sensors and the calibration factor is applied to the output of the second current sensor.

11. A method of measuring current as a function of time during the production of a weld on a resistance welding machine wherein electrodes apply an electrode mechanical load to workpieces and a circuit applies voltage across the workpieces such that current flows through the workpieces and generates heat which raises the temperature of the workpieces, the method comprising:
measuring current flowing through the electrodes by measuring an initially applied current flowing through the electrodes using an initial calibrated current sensor, and a sensor which measures a linear output indicative of current,
dividing an initial calibrated current sensor measurement by the linear output to determine a calibration factor,
continuing to monitor the current with the initial calibrated current sensor, and
processing the linear output with the calibration factor to calculate the current flowing through the electrodes during the weld.

12. A method of measuring weld thermal response as a function of time during the production of a weld on a resistance welding machine wherein electrodes apply an electrode mechanical load to workpieces and a circuit applies voltage across the workpieces such that current flows through the workpieces and generates heat which raises the temperature of the workpieces, the method comprising:
monitoring a first parameter responsive to a change in the electrode mechanical load with respect to the electrode mechanical load applied prior to application of the heat;
monitoring a second parameter responsive to a change in position of linkage applying the electrode load with respect to linkage position prior to application of the heat;
processing a composite of the first parameter and the second parameter to produce a derived measurement representative of the thermal response of the weld;
measuring an initially applied current flowing through the electrodes using an initial calibrated current sensor and a sensor which measures a linear output indicative of current, dividing an initial calibrated current sensor measurement by the linear output to determine a calibration factor, continuing to monitor the current with the initial calibrated current sensor, and processing the linear output with the calibration factor to calculate the current flowing through the electrodes.

13. A method of measuring weld thermal response as a function of time during the production of a weld on a resistance welding machine, comprising:
positioning workpieces between the electrodes of the resistance welding machine and applying an electrode mechanical load to workpieces using the electrodes;
applying voltage across the workpieces and generating heat which raises the temperature of the workpieces;
monitoring a first parameter responsive to a change in the electrode mechanical load with respect to the electrode mechanical load applied prior to application of the heat;
monitoring a second parameter responsive to a change in position of linkage applying the electrode load with respect to linkage position prior to application of the heat;
processing a composite of the first parameter and the second parameter to produce a derived measurement representative of the thermal response of the weld;
monitoring of electrode force using a composite measurement which is a function of information from two sensors wherein one sensor monitors force applied to the linkage applying the electrode force and the other sensor monitors a change in electrode force during the weld, the method including automatically calibrating the sensors to increase accuracy of measurement of instantaneous electrode force as a function of time.

14. A method of measuring weld thermal response as a function of time during the production of a weld on a resistance welding machine wherein electrodes apply an electrode mechanical load to workpieces and a circuit applies voltage across the workpieces such that current flows through the workpieces and generates heat which raises the temperature of the workpieces, the method comprising:
- monitoring a first parameter responsive to a change in the electrode mechanical load with respect to the electrode mechanical load applied prior to application of the heat;
- monitoring a second parameter responsive to a change in position of linkage applying the electrode load with respect to linkage position prior to application of the heat;
- processing a composite of the first parameter and the second parameter to produce a derived measurement representative of the thermal response of the weld;
- monitoring electrode current using two current sensors wherein a first current sensor measures current during a short duration at the start of the weld and the second current sensor measures current for the balance of the weld, the first current sensor providing a calibrated accurate current reading upon initiation of current for a limited duration of time after the first current is applied to the electrodes and the second current sensor providing an output signal that is a linear function of electrode current over an extended duration of time.

15. The method of claim 14, wherein before transitioning to the second current sensor, a calibration factor is calculated on the basis of simultaneous measurements of the first and second current sensors, the method further comprising conditioning the output signal of the second current sensor by applying the calibration factor to the output signal of the second current sensor.

16. The method of claim 15, wherein: (a) the first current sensor comprises a Rogowski coil which outputs current measurements to a monitoring system which integrates the current measurement before or upon initiation of current to the electrodes, (b) calibration of the second current sensor comprises dividing a parameter representative of current measured by the first current sensor by conditioned signal output of the second current sensor, and/or (c) the second sensor calibration is performed when current increases sufficiently to provide a predetermined sensor output resolution but before integration offset error introduces measurement inaccuracy exceeding resolution of the second current sensor output.

17. The method of claim 15, wherein the conditioning of the output signal of the second current sensor comprises subtracting an offset from the second current sensor output.

18. The method of claim 14, wherein the second current sensor is a Hall effect sensor responsive to a magnetic field produced from the electrode current.

19. The method of claim 14, wherein the second current sensor is a primary current measuring device.

* * * * *